United States Patent

Goto et al.

[15] 3,647,975

[45] Mar. 7, 1972

[54] RANDOM ACCESS DISCRETE ADDRESS SYSTEM

[72] Inventors: Kimio Goto, Fujisawa; Hiroyasu Nakamura, Yokohama, both of Japan

[73] Assignee: Hitachi, Ltd., Chiyoda-ku, Tokyo, Japan

[22] Filed: Aug. 31, 1970

[21] Appl. No.: 68,105

[30] Foreign Application Priority Data

Feb. 27, 1970 Japan ....................45/16205

[52] U.S. Cl. ....................179/15 BA

[51] Int. Cl. ....................H04j 3/04

[58] Field of Search ....................179/15 BA, 41 A, 15 BZ; 325/55; 343/202

[56] References Cited

UNITED STATES PATENTS 3,440,353 4/1969 Salmet ....................179/15 BZ

*Primary Examiner*—Ralph D. Blakeslee
*Attorney*—Craig, Antonelli & Hill

[57] ABSTRACT

A random access discrete address system comprising all or a part of: a means for generating, through call information, a call signal which connects the line for a certain period of time and also a variable address selection command which connects the line until the completion of a conversation, and for generating, through call signal receipt information, a ringback signal and an intrinsic address selection command which connects the line until the completion of a conversation and further, for generating in some cases a busy signal and an intrinsic address selection command and a variable address prohibition command which connect the line only for a certain period of time; a means for switching each time slot of an F–T matrix address and reading out for each time slot an address memory recorded by a method of setting a subscriber's number including a dial or touch tone, thereby to determine the path to the frequency slot of said F–T matrix address to be switched to; a means for intercepting an RF input of receiver by means of a pulse which is continued over a sampling interval upon each generation of an output code pulse of a primary modulator; a means for detecting an output code pulse of a primary modulator each time upon the start of a voice or signal and for delivering a synchronizing pulse for a receiver of a called party; and a means for temporarily storing output code pulses of receiver, reading the code pulses through a synchronizing pulse of a transmitter at the same station as one comprising said receiver, and transferring to another synchronizing pulse train by detecting a stepout each time of the occurrence of said stepout, thereby to accomplish a synchronized relay.

6 Claims, 19 Drawing Figures

INVENTORS

KIMIO GOTO

HIROYASU NAKAMURA

BY Craig, Antonelli, Stewart & Hill

ATTORNEYS

INVENTORS
KIMIO GOTO
HIROYASU NAKAMURA

BY Craig, Antonelli, Stewart & Hill
ATTORNEYS

INVENTORS

KIMIO GOTO

HIROYASU NAKAMURA

BY Craig, Antonelli, Stewart & Hill

ATTORNEYS

INVENTORS
KIMIO GOTO
HIROYASU NAKAMURA

BY Craig, Antonelli, Stewart & Hill
ATTORNEYS

INVENTORS

KIMIO GOTO

HIROYASU NAKAMURA

BY Craig, Antonelli, Stewart & Hill

ATTORNEYS

INVENTORS

KIMIO GOTO

HIROYASU NAKAMURA

BY Craig, Antonelli, Stewart & Hill

ATTORNEYS

INVENTORS
KIMIO GOTO
HIROYASU NAKAMURA

BY Craig, Antonelli, Stewart & Hill
ATTORNEYS

Patented March 7, 1972

3,647,975

13 Sheets-Sheet 8

INVENTORS
KIMIO GOTO
HIROYASU NAKAMURA

BY Craig, Antonelli, Stewart & Hill
ATTORNEYS

INVENTORS
KIMIO GOTO
HIROYASU NAKAMURA
BY Craig, Antonelli, Stewart & Hill
ATTORNEYS Patented March 7, 1972 3,647,975

13 Sheets-Sheet 10

INVENTORS

KIMIO GOTO

HIROYASU NAKAMURA

BY Craig, Antonelli, Stewart & Hill

ATTORNEYS

INVENTORS
KIMIO GOTO
HIROYASU NAKAMURA
BY Craig, Antonelli, Stewart & Hill
ATTORNEYS

INVENTORS

KIMIO GOTO

HIROYASU NAKAMURA

BY Craig, Antonelli, Stewart & Hill

ATTORNEYS

INVENTORS
KIMIO GOTO
HIROYASU NAKAMURA
BY Craig, Antonelli, Stewart & Hill
ATTORNEYS

RANDOM ACCESS DISCRETE ADDRESS SYSTEM

BACKGROUND OF THE INVENTION

1. Field of the Invention

This invention relates to a random access discrete address system.

2. Description of the Prior Art

A frequency division mobile radio system which monopolizes a narrow-band channel allotted by a frequency division is generally used. On the other hand, a system in which a number of subscribers jointly use a wide band has recently come to be watched by those in the art. This system converts such information as a voice into a code pulse train by means of a primary modulator mainly consisting of a digital modulator, and converts each code pulse itself into an address code of a called party, thereby transmitting it to said called party to achieve a random access when and as desired. For this address code, a discrete address which is obtained by combining a frequency slot and a time slot is used, the total number of available subscribers being determined by the number of proper combinations of said frequency and time slots. This particular address is called an F–T matrix address, and it is well known that a mobile radio communication system employing such an address is called a random access discrete address system (RADAS).

SUMMARY OF THE INVENTION

An object of the present invention is to provide a RADAS which satisfies the following conditions:

1. Circuit operations such as call, answer and forcible squeezing are successfully conducted without delay.
2. A primary modulator is provided with the ability to reduce the number of emitting pulses and to resist noises, and also provided with a synchronizing system to achieve an effective synchronized interception in the receiver.
3. Each component associated with a secondary modulator can function as a digital circuit, taking advantage of the synchronizing system of the primary modulator.
4. An address is automatically supplied by the operation of a dial, etc.
5. The switching is made between a variable address and an intrinsic address at the time of the address supply, thereby to simplify the circuit arrangement.
6. A waveform of the transmitter output is shaped from the view point of an enlarged dynamic range.
7. If the same band is used for both transmission and reception, the receiver RF input can be intercepted during the period in which a transmitting pulse is being delivered, and furthermore, even under such a condition, an almost simultaneous transmission and reception can be performed.
8. Synchronizing pulses in synchronization with a sampling frequency of the primary modulator can be delivered over a certain period of time immediately after the start of a voice in order to assure and facilitate the successful pullin operation at the time of a synchronized interception of the receiver.
9. Pulse positions of a code pulse train obtained from the receiver can be converted into synchronous pulse positions of the transmitter in a relaying operation.

The above and other objects, features and advantages will be made apparent by the detailed description taken in conjunction with the accompanying drawings.

DESCRIPTION OF THE PREFERRED EMBODIMENTS

Figure 1:
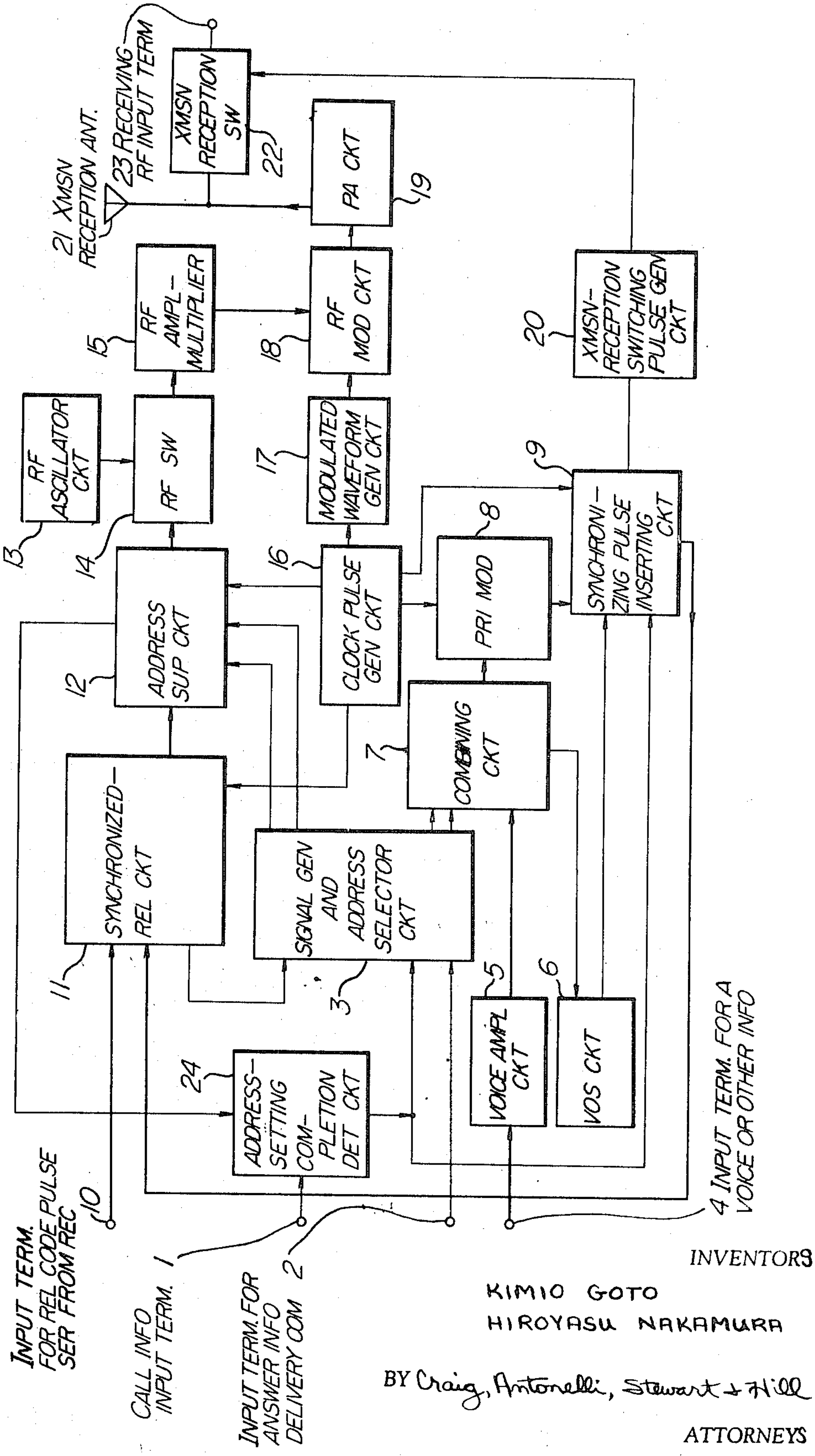
FIG. 1 shows a schematic block diagram of the RADAS transmitter according to the present invention.

Referring to FIG. 1, the reference number 1 shows an input terminal for the calling information, 2 an input terminal for the answering information delivery command, 3 a circuit for signal generation and address selection, 4 an input terminal for a voice or other information, 5 a voice amplifier circuit, 6 a VOS (Voice Operated Switch) circuit, 7 a combining circuit, 8 a primary modulator, 9 a circuit for inserting a synchronizing pulse, 10 an input terminal for relaying code pulse series supplied from the receiver, 11 a synchronizing circuit for the relay, 12 an address supply circuit, 13 an RF oscillator circuit, 14 an RF switch circuit, 15 an RF amplifier-multiplier circuit, 16 a clock pulse generator circuit, 17 a modulating waveform generator circuit, 18 an RF modulator circuit, 19 a PA circuit, 20 a transmission-reception switching pulse generator circuit, 21 a transmission and/or reception antenna, 22 a transmission-reception switching circuit, 23 an input terminal for the receiving RF and 24 a circuit for detecting the completion of an address-setting.

Assume that the calling information is produced at the terminal 1 by the hookoff operation of a calling station. A calling information delivery command is generated through the address-setting completion detector circuit 24, and a signal corresponding to the calling information is selected by the signal generator and address selector circuit 3, which signal is applied to the combining circuit 7 and delivers a variable address selection command to the address supply circuit 12. When the called station receives the calling information such as a dial tone signal, an answer information delivery command including a ring-back signal or a busy signal appears at the terminal 2, whereby a signal corresponding to the answer information is selected at the signal generator and address selector circuit 3. This signal is applied to the combining circuit 7. At the same time, the signal generator and address selector circuit 3 produces an intrinsic address selection command, which is applied to the address supply circuit 12. The output of the combining circuit 7, namely, a calling signal or answer signal is applied to the primary modulator 8, which converts the signal into a pulse series, delivering it to the address supply circuit 12 through the synchronizing pulse inserting circuit 9 and the relay synchronizer circuit 11.

The address supply circuit 12 consists of an intrinsic-address setting circuit and a variable-address setting circuit, the intrinsic address being preset for the station involved. At the time of calling, the variable address is set at the intrinsic address of the called station by a dialing operation. At the time of calling, a variable address is selected at the address supply circuit 12 by a variable address selection command generated by the signal generator and address selector circuit, while, at the time of answering, an intrinsic address is selected according to an intrinsic-address selection command. Especially at the time of calling, the address-setting completion detector circuit 24 is so arranged that a variable address can be set only after the hookoff operation and also the calling information delivery command can be generated only after the variable address is set. Therefore, the calling information never suffers a loss at the address supply circuit 12.

After calling, a ring-back signal and then an answer signal including a voice is received from the called station after a hookoff operation, enabling the calling station to start talking. This voice information is delivered from the terminal 4 through the voice amplifier circuit 5 and the combining circuit 7 to the primary modulator 8 which converts the voice information into a series of code pulses which in turn are applied to the address supply circuit through the synchronizing pulse inserting circuit 9 and the relay synchronizer circuit 11. At the address supply circuit 12, a variable address which is selected in advance at the time of call signal delivery supplies an address of the called station to the code pulse series converted from the voice information of the calling station. The called station, after receiving the call signal and transmitting a ring-back signal, begins talking by using the preselected intrinsic address.

The address supply circuit 12 produces a plurality of time slot pulses for each pulse comprising the code pulse series applied thereto and determines an RF frequency or frequency slot to be given to each time slot in accordance with the predetermined F–T matrix address. Each time slot enables the RF switching circuit 14 to switch to an RF oscillating signal corresponding to the frequency slot thus determined. The F–T matrix address pulse which is generated for each of the above-mentioned code pulses is a radio pulse with a rectangular wave envelope, the radio carrier frequency of the pulses being lower than the transmission carrier frequency. This is because the switching operation for a low radio frequency is more stable than that for a high radio frequency. Accordingly, to obtain the required transmission carrier frequency, these F–T matrix pulses are amplified and multiplied at the RF amplifier-multiplier circuit. This amplifier-multiplier circuit produces such as effect that a fundamental wave and a higher harmonic of the radio oscillating signal which leak out except during the switching period are removed. This is due to the fact that the multiplying operation is usually performed by a class-C amplifier and that an amplifier is usually equipped with a band-pass filter which passes only the required radio wave.

The spectrum width taken by the F–T matrix address pulses consisting of a plurality of pulses of different radio frequencies with the rectangular wave envelope thus obtained is considered to be much greater than when such an envelope takes the form analogous to the Gauss wave. As a result, it may be understood from FIG. 1 that the radio pulses with the rectangular wave envelope are shaped at the RF modulator circuit 18 by the Gausslike wave, say, a square cosine wave. This is made possible by the amplitude-modulation of the rectangular wave input of the RF modulator 18. In the above-mentioned amplitude modulation, it is necessary that the timing of the amplitude-modulated wave, say a square cosine wave applied to the RF modulator circuit 18 conforms to the timing of the RF pulses applied to the RF modulator circuit 18. If both disagree with each other, the envelope of the shaped waveform comes to have a rectangular rise or fall, making it impossible to obtain the required spectrum width. To cope with this problem, the time slot pulses from which the RF pulses are derived have to be synchronized with the pulses from which the modulating wave is produced. According to the system of the present invention, the function of such a synchronization is given by the clock pulse generator circuit 16 to the address supply circuit 12 and the modulating waveform generator circuit 17. In addition, the modulating waveform generator circuit 17 is provided with a pulse corrector to correct the phase difference caused by the difference of the length of the lines.

The RF pulses thus shaped are sent out by the antenna 21 after being power amplified into a required output by the PA circuit 19. The RF modulator circuit 18 and the PA circuit 19 may be so arranged that the shaping of the envelope and the power amplification are accomplished at the same time. The transmission-reception switching pulse generator circuit 20 generates a pulse for interrupting the receiving RF input for each transmitted signal pulse by the transmission-reception switching circuit 23. Since this transmission-reception switching pulse has to be generated each time a signal pulse appears, such generation is synchronized with the output of the synchronizing pulse inserting circuit 9. The output of the synchronizing pulse inserting circuit 9 contains a synchronizing pulse for the receiver of the called party in addition to the signal pulse series corresponding to a voice or signal information, that is, all the signal pulses actually transmitted. Therefore, it is possible to make the transmission-reception switching pulse interrupt the receiving input for any transmitting pulse by generating the transmission-reception switching pulse in synchronization with such a transmitting pulse.

While two stations are talking with each other, it may be expedient in some cases to deliver a synchronizing pulse over a short period at the initial stage of transmitting a voice or signal in order to accomplish the pullin of the synchronous interception circuit, depending on the reception system of the called party. Accordingly, a signal which appeared at the terminal 4 is applied to the primary modulator 8 through the voice amplifier 5 and the combining circuit 7, whereby the primary modulator 8 generates a signal pulse as an output. This pulse is immediately stored and a synchronizing pulse is inserted in place of this signal pulse for a certain period of time. In this case, it is necessary to control the pattern of the synchronizing pulse depending on the mode of communicating a voice or signal, whether it is a normal condition or forcible squeezing. For this purpose, the synchronizing pulse inserting circuit 9 delivers a synchronizing pattern in accordance with the type of the calling information delivery command appearing at the address-setting completion detector circuit 24.

In the above-mentioned system in which a pulse generated at the output of the primary modulator is stored and a synchronizing pulse is generated, there is a need to generate a synchronizing pulse when restarting the voice information after a break. To achieve this, each time the break begins, it has to be detected to clear the memory of the voice starting. This requirement is met by the VOS circuit 6 which detects the time at which the output of the combining circuit 7 causes the start of a break of the voice or signal, the resulting information being supplied to the synchronizing pulse inserting circuit 9.

When the relaying operation is conducted by the use of the RADAS transmitter-receiver, one conceivable method is that relay signals received by the receiver are converted into a series of code signal pulses by the F–T matrix address decoder, which are further changed into voice signals by the primary demodulator and are applied to the primary modulator of the transmitter, and then supplied with the F–T matrix address again. This method, however, inconveniently adds to the steps of the primary modulation and demodulation due to the relaying operation, increasing the quantizing noises and deteriorating the quality of communication.

The system according to the present invention has no additional primary modulator nor primary demodulator but instead employs a means for supplying an address to the code pulse series which are decoded by the receiver. In this cases, the code pulse series decoded by the receiver are not necessarily in the same phase as that of the transmitting signal. If the F–T matrix address is supplied by the transmitter in a digital manner synchronizing with the clock pulse of the transmitter, unlike the case in which said F–T matrix address supply is performed by utilizing an analogue delay line, it is necessary to rearrange the decoded code pulse series in phase with the transmitting signal. For this purpose, the output code pulse series appearing at the terminal 10 are delivered to the relay synchronizing circuit 11 to be synchronized again.

Whether the address to be selected as a transmitting address corresponding to a receiving address is an intrinsic or variable address is predetermined. Such selection is accomplished through the signal generator and address selector circuit 3 following the similar procedure as at the time of calling or answering.

As may be understood from the above description, the RADAS according to the present invention meets all the requisites for this transmission system mentioned earlier. Also, with regard to the requisite 2, a synchronizing ternary delta modulator or similar system is employed as a primary modulator, facilitating the digital process of each part of the transmitter. In view of the recent trend toward a superminiaturized logic element, this contributes to improvements in the reliability of the system, showing the ability of the system to faithfully perform the complex functions mentioned above.

Figure 2:
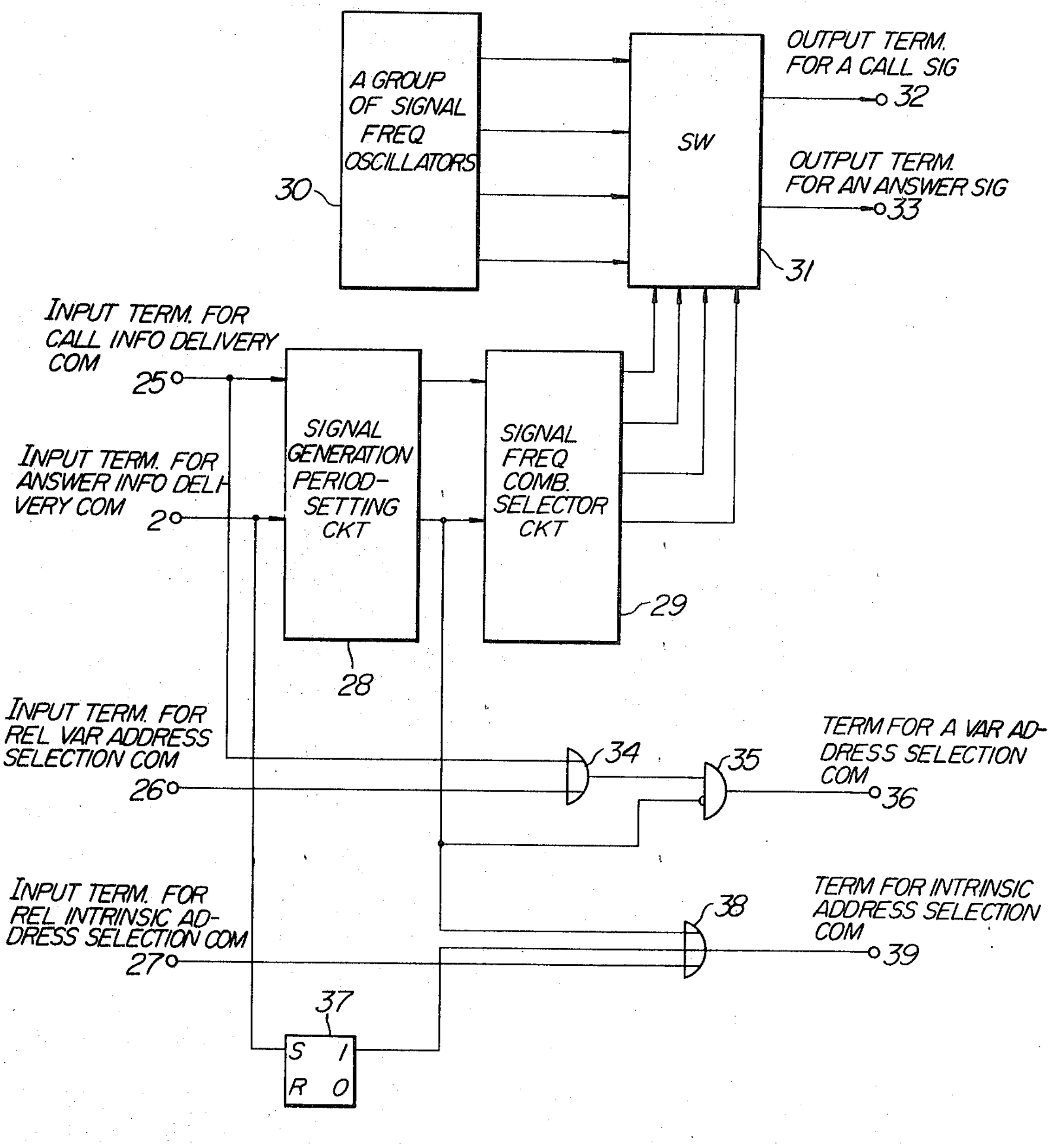
FIG. 2 shows a detailed block diagram of the signal generator and address selection circuit of of RADAS transmitter according to the present invention.

Following is a more detailed explanation of each component of the RADAS transmitter as shown in the block diagram of FIG. 1: In FIG. 2, the terminal 25 shows an input terminal for a calling information delivery command, the numeral 26 shows an input terminal for a relay variable address selection command, the numeral 27 an input terminal for a relay intrinsic address selection command, the numeral 28 a signal generation period-setting circuit, the numeral 29 a signal frequency combination selector circuit, the numeral 30 a group of signal frequency oscillators, the numeral 31 a switch, the numeral 32 an output terminal for a calling signal, the numeral 33 an output terminal for an answer signal, the numeral 34 and OR gate for selecting a variable address, the numeral 35 an AND gate, the numeral 36 a terminal for a variable address selection command, the numeral 37 a memory for a ring-back signal, the numeral 38 an OR gate for intrinsic address selection, and the numeral 39 a terminal for an intrinsic address selection command.

A calling information delivery command or an answering information delivery command supplied from the terminal 25 or 2 respectively is applied to the signal generation period-setting circuit 28, which generates a single pulse continuing for a certain period of time according to the above-mentioned commands. The width of this single pulse is the same as the duration of the signal delivered. For example, if the duration of a signal is 500 ms., the same width of the pulse can be easily obtained by a monostable multivibrator. That is an output pulse with a certain width corresponding to the calling information or answering information which is generated at the signal generation period-setting circuit 28 is applied to the signal frequency combination selector circuit.

Now, assume that this signal system is for the simultaneous delivery of a multiplicity of frequencies and that two frequencies out of the four frequencies $f_1, f_2, f_3$ and $f_4$ are delivered at the same time. A combination of $f_1$ and $f_2$ or $f_1$ and $f_3$ is available for calling information or squeezing information respectively, and the $f_2$-$f_3$ and $f_3$-$f_4$ combinations are available for ring-back information and the busy information respectively. The signal frequency combination selector circuit 29 is aimed at selecting a combination of signal frequencies as mentioned above in accordance with the calling information or answering information, which can be achieved by the use of a very simple logic circuit. A switch pulse with a certain pulse width is generated for each signal frequency desired, and a required signal is obtained through the switch 31 out of the signals generated by the signal frequency oscillators 30. Thus, a multifrequency signal corresponding to the calling information and the answering information is produced for a certain duration at the terminals 32 and 33 respectively.

The calling information delivery command is generated at the terminal 25 only after the address-setting is effected on completion of a hookoff operation, and continues until the next hookon operation. These operations are performed by the address-setting completion detector circuit 24. In a similar fashion, the relay variable address selection command continues to appear at the terminal 26 until the relaying operation is completed. Both of these commands pass through the OR-gate 34 and the AND-gate 35 to be sent out from the terminal 36 as a variable address selection command. As a consequence, the command from the terminal 36 continues until the communication or relay is ended by setting a variable address.

The answering information delivery command is generated at the terminal 2 as soon as a receiver identifies calling information (a dial-tone signal or offering signal) from a given station. This command delivers a ring-back signal when the receiving station is available for talking and a busy signal if the line is busy. These signals continue only for a certain period of time by means of an intrinsic address regardless of whether the receiving station is available for talking or is busy. However, when a ring-back signal is delivered, that is, when the receiving station is not busy, the talking is further continued by means of an intrinsic address. Accordingly, the ring-back signal is stored at the memory 37 until the end of the talking and an intrinsic address selection command is delivered from the terminal 39 through the OR-gate 38, which is continuously supplied with a relay intrinsic address selection command from the terminal 27 until the relaying operation is ended. When delivering a busy signal, in particular, the output pulse of the signal generation period-setting circuit 28 is applied to the OR-gate 38, thereby monopolizing the intrinsic address during the delivery of the busy signal. Said output pulse is also applied to the AND-gate 35 to prohibit it. This is in order to prevent a variable address from being selected during the delivery of a busy signal. It is so arranged that, even if a variable address is already selected, it is intercepted during the delivery of a busy signal and switched to an intrinsic address, the original condition being restored after the completion of delivery of the busy signal.

In other words, the signal generator and address selector circuit 3 generates a single pulse for a certain duration in accordance with the calling information or answering information delivery command and selects a combination of gate circuits assigned to a call signal (a dial-tone signal or squeezing signal) or an answer signal (a ring-back signal or a busy signal), thereby to switch to a multifrequency signal by means of said single pulse, generating a desired multifrequency signal over a certain period of time. At the same time, the calling information delivery command is taken out as a variable address selection command, taking advantage of the fact that the calling information delivery command continues until the talking ends. On the other hand, in the case of a busy information delivery command, that single pulse for switching to a multifrequency signal which has been generated by said delivery command produces an intrinsic address selection command for the same time interval during which the answering information delivery command continues. During this period, the selection of a variable address is prohibited. In the case of a ring-back information delivery command, a pulse which continues until the talking ends is generated by said command apart from said single pulse, enabling an intrinsic address to be selected.

Figure 3:
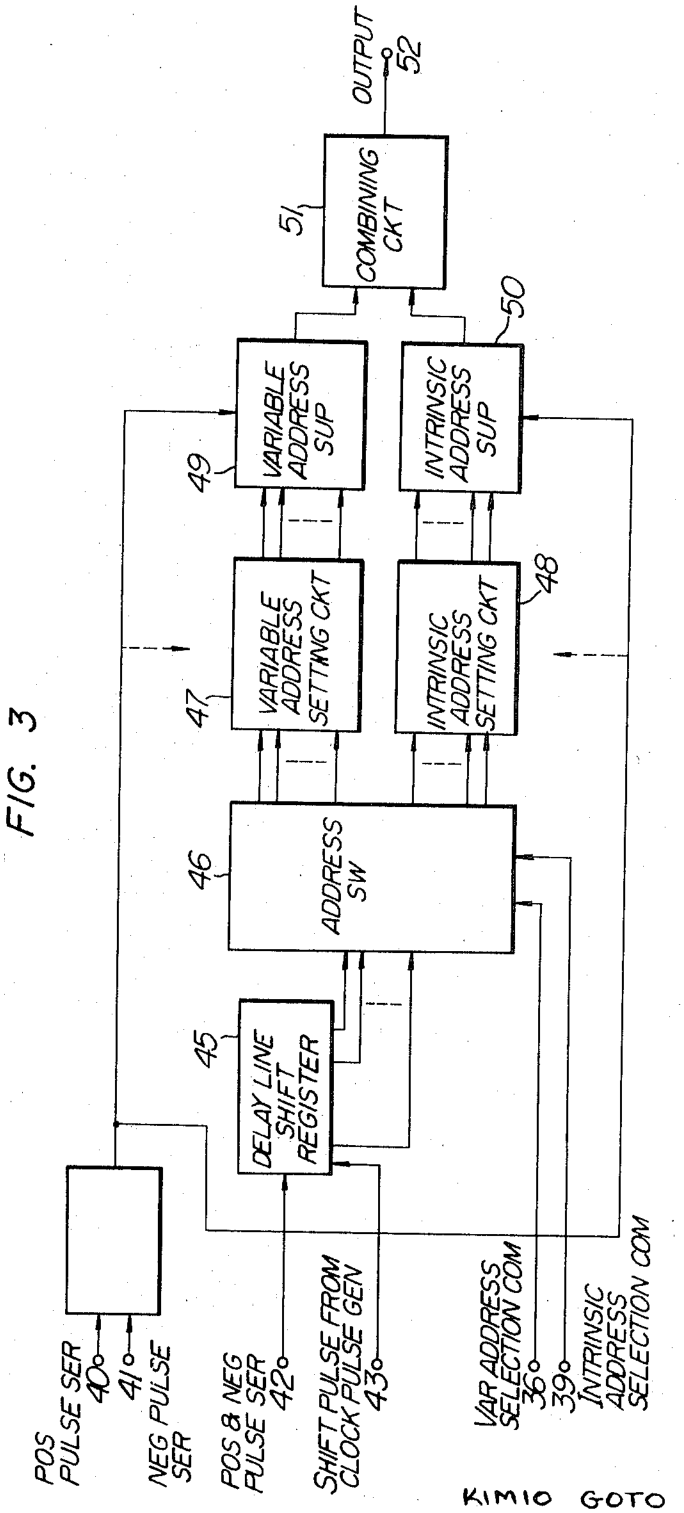
FIG. 3 is a detailed block diagram showing an address supply circuit.

A block diagram of the address supply circuit of the RADAS transmitter is shown in FIG. 3. The numerals 40 and 41 show input terminals for positive and negative pulse trains respectively supplied from the relay synchronizing circuit 11. The numeral 42 shows a similar input terminal for both positive and negative pulse trains from the relay synchronizing circuit 11. The terminal 43 receives a shift pulse from the clock pulse generator circuit 16. The numeral 45 shows a delay line shift register, 46 an address switching circuit, 47 a variable address-setting circuit, 48 an intrinsic address-setting circuit, 49 and 50 a variable and an intrinsic address supply circuit respectively, 51 a combining circuit and 52 an output terminal.

Under this system, not only the number of emitting pulses of the primary modulator 8 can be remarkably reduced and much of the noises are eliminated, but also a synchronizing modulation can be achieved, one of such embodiments being a synchronizing ternary delta modulation. It is natural that according to this system positive and negative pulses are generated. Therefore, it is necessary to supply different F–T matrix addresses to positive and negative pulses. An address supplied to a positive signal is called a positive address and one supplied to a negative signal a negative address hereinafter.

The delay line shift register is supplied with positive and negative code pulse trains from the terminal 42, which are shifted by a shift pulse supplied from the terminal 43, thereby generating for each input code pulse delay pulses which are equal in number to that of the steps of the shift register, and at the same interval as that of the shift pulse repetition. As a result, delay pulses corresponding to the entire time slot positions can be generated by making the interval of shift pulses equal to the time slot width of the F–T matrix address and by making the number of steps of the shift register equal to the number of the time slots inserted between a sampling interval of the primary modulator. In this way, a delay pulse generated for each input signal pulse is switched at the address switching circuit 46 by a variable address selection command or an intrinsic address selection command which is delivered from the signal generator and address selector circuit 3 through the terminal 36 or 39. Then it is applied to the variable address-setting circuit 47 by the variable address selection command and to the intrinsic address-setting circuit 48 by the intrinsic address selection command.

At the variable address-setting circuit 47, a number allotted in the F–F matrix address is set by a dial and it is electronically stored in the form of a time slot and a frequency slot. On the other hand, at the intrinsic address-setting circuit 48, the F–T matrix address assigned is preset by means of a rotary switch, etc. The storage of said address is usually that of a positive address. The variable address-setting circuit 47 or the intrinsic address-setting circuit 48 selects a plurality of delay pulses corresponding to the time slots of the pulses constituting the address, from among the output delay pulses of the shift register 45. The selected delay pulses are made to read corresponding frequency slot memories. The pulses read out in this fashion at the pulse position constituting each address are applied to the variable address supply circuit 49, which determines the path to a radio carrier to which the component pulses of each address are to be switched. Also, the positive or negative signal information stored in the positive and/or negative memory 44 is applied to the variable address-setting circuit 47 or the variable address supply circuit 49, where it is determined which address, positive or negative, should be given to the input signal pulse. The above description of the variable address-setting circuit 47 and the variable address supply circuit 49 holds true for the intrinsic address-setting circuit 48 and the intrinsic address supply circuit 50, the output of the circuits 49 and 50 being combined at the combining circuit 51 to be finally taken out from the terminal 52 as a pulse for switching to a radio carrier.

Figures 4A, 4B:
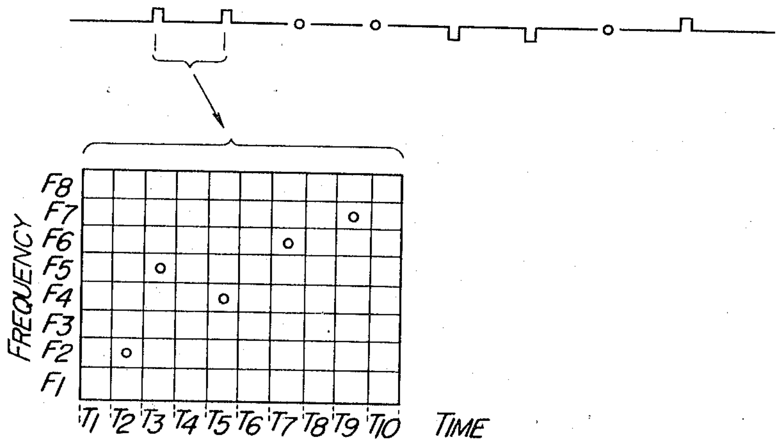
FIGS. 4*a*, 4*b* and 4*c* are diagrams for explaining the F–T matrix address.
Figure 4C:
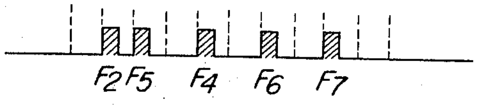

The operation of the variable address-setting circuit 47 will be explained below. FIGS. *4a*, *4b* and *4c* respectively show an output code pulse series of the synchronizing ternary delta modulator for the primary modulator, a F–T matrix and the corresponding pulses of the F–T matrix address. As can be seen from this figure, the F–T matrix address consists of time slot positions which are selected from among those time slot positions into which a sample interval is divided, the selected time slot positions being assigned to selected frequency slots. In designating an address according to the F–T matrix address as shown in FIG. 4, the following methods are considered:

1. Each cell of the F–T matrix is given a serial number and the number of the cell in which any component pulse of an address exists is designated as an address number.
2. Each of all the conceivable addresses is given a serial number and this number is designated as an address number.
3. The number of the frequency slot and the time slot themselves of the cell where the component pulses of the address exist is designated as an address number.

Among the above-mentioned three ways of address number designation, that of (3) is considered to be easiest to employ, and a preferred embodiment of this particular method is described below.

Figure 5:
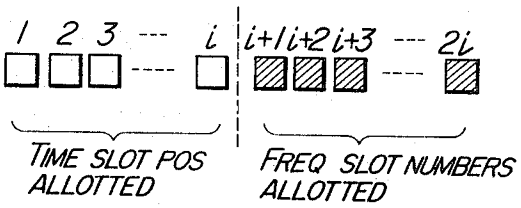
FIG. 5 is a diagram for explaining the dial number sequence.

FIG. 5 illustrates the order of the dial numbers to be dialled in accordance with the address number designation method (3) mentioned above. When the number of pulses making up an address is *i*, the first *i* times of dialling designates the time slot positions of the component pulses and the next *i* times of dialling the frequency slot positions thereof. The *n*th dialling for allotting a time slot and the (*i*+*n*th) dialling for allotting a frequency slot are the designating operation for the same component pulses of an address. In this case, the number to be dialled is that of the time slot or the frequency slot. For example, FIG. 4 shows a case in which the numbers 23579 and 25467 are dialled, the former showing the time slot positions and the latter the frequency slot positions.

Figure 6:
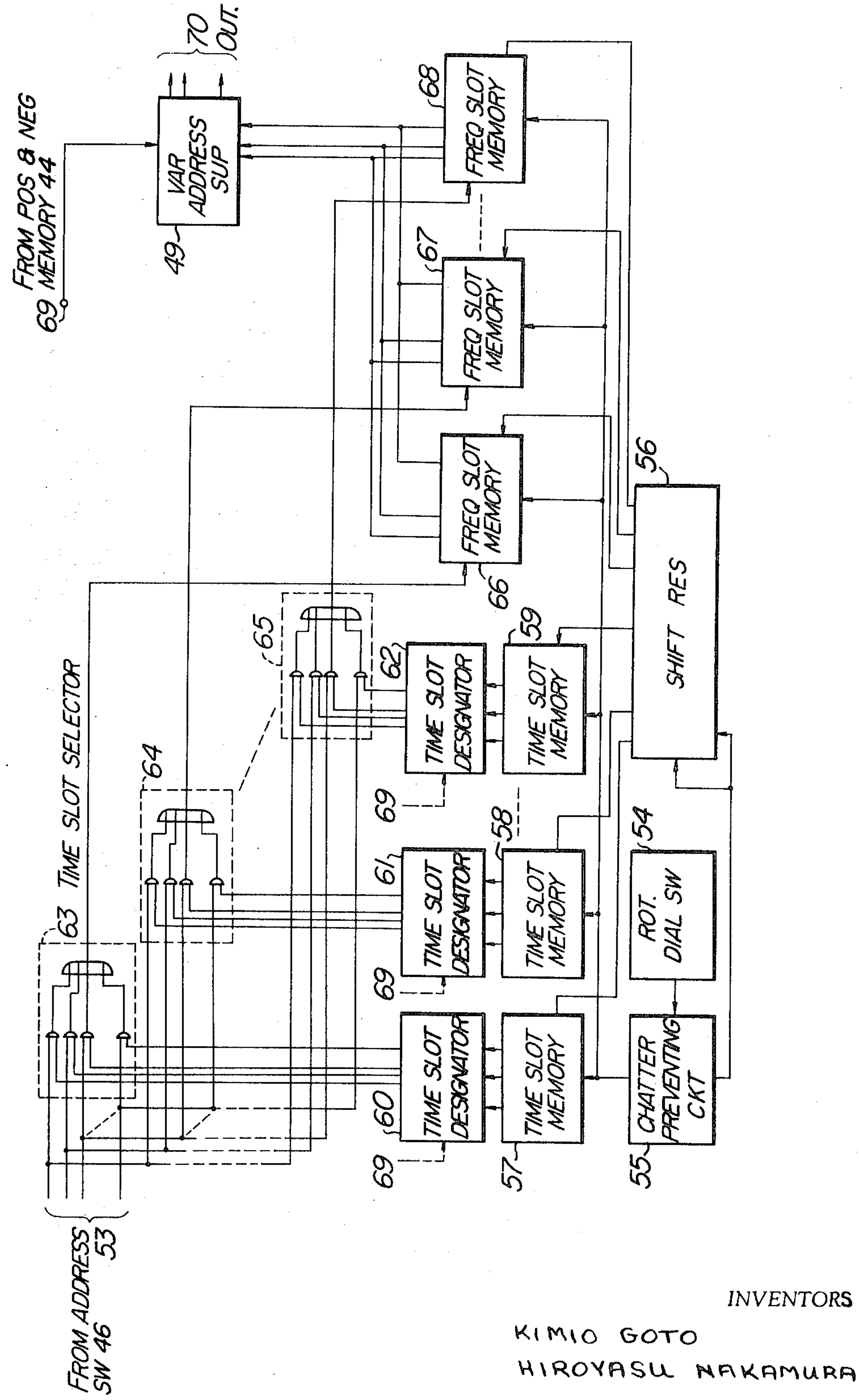
FIG. 6 is a detailed block diagram showing an embodiment of a system for setting a variable address.
Figure 7A:
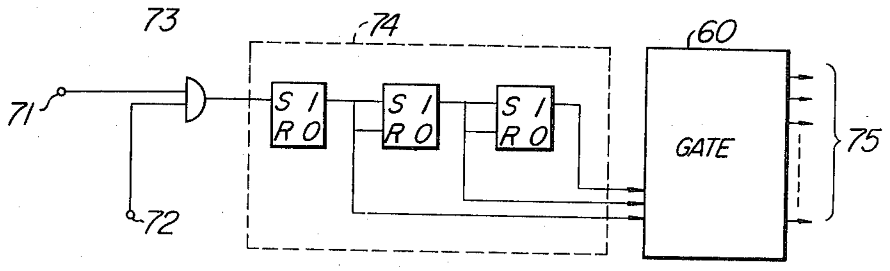
FIGS. 7*a* and *b* are block diagrams of the address memory.
Figure 7B:
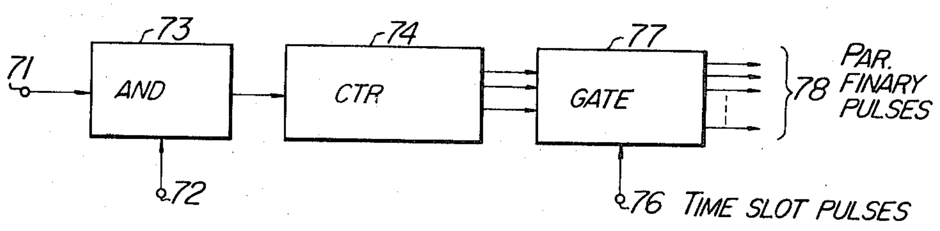

FIG. 6 shows an embodiment of the variable address-setting system by a dialling operation according to the address number designation method (3) mentioned above. The reference numeral 53 shows an input terminal for the output from the address switching circuit 46, i.e., the entire time slot pulses within one interval of sampling. The numeral 54 shows a rotary dial switch, 55 a chatter-preventing circuit, 56 a shift register, 57, 58 and 59 show time slot memories, 60, 61 and 62 time slot designating circuits, 63, 64 and 65 time slot selector circuits, 66, 67 and 68 frequency slot memory circuits, 49 shows the above-mentioned variable address supply circuit, 69 an input terminal for the output information (a positive or negative signal pulse information) from the positive and negative memory 44, and 70 an output terminal for pulses from the variable address supply circuit 49.

The designated number is dialled by the rotary dial switch 54 in the order of the address number. Then the dial pulses are generated the number of times equivalent to the dial number, in addition to a pulse representing one dialling operation which is supplied through the $D_3$ contact of the dial switch. Chattering is liable to occur at the rise or fall point of these dial pulses and the additional pulse from the $D_3$ contact, necessitating the provision of the chatter-preventing circuit 55. The dial pulses from the chatter-preventing circuit 55 are applied to the time slot memory circuits 57, 58 and 59 and the frequency slot memory circuits 66, 67 and 68 at the same time, while the additional pulse caused at the $D_3$ contact is applied from the chatter-preventing circuit 55 to the shift register 56. This shift register writes the dial pulses into the time slot memories 57, 58 and 59 and the frequency slot memories 66, 67 and 68 in the order of the dial as shown in FIG. 5. This writing operating is performed by a writing gate consisting of a single AND gate as shown in the time slot memory block diagram of FIG. *7a* and the frequency slot memory block diagram of FIG. *7b*. The dial pulses in the number equivalent to the digits of the address number are applied through this gate to the counter 74 to be counted. Combining the stored memories at each stage, a binary number corresponding to the decimal number of the dial number is obtained. In the case of the time slot memory, the memories at each stage are combined at the time slot designating circuits 60, 61 and 62 to designate appropriate time slots. Therefore, it is only those pulses designated from among the time slot pulses supplied from the terminal 53 that are selected at the time slot selector circuits 63, 64 and 65 which consist of AND gates in the same number as that of the input lines and one OR gate. The AND gate may be combined with the time slot designating circuit 60, 61 or 62. The time slot pulses obtained in this fashion are applied to corresponding frequency memories through the terminal 76 as shown in FIG. *7b*, and read the binary memory stored in the counter 74 from the gate 77, thereby enabling parallel binary pulses to be taken out from the terminal 78 at each time slot pulse position. Each parallel binary pulse thus read out of the frequency memories 66, 67 and 68 is applied through a common line to the variable address supply circuit 49, to be taken out from the terminal 70 to switch to the designated radio carrier.

Usually, a positive address is set. For a negative address, rules are laid down between positive and negative addresses whereby a positive address is converted into a negative address. The method of laying down such rules is divided into the possibilities:

1. The frequency slot to be used is the same for positive and negative addresses and only the time slot is changed.
2. The time slot to be used is the same for positive and negative addresses and only the frequency slot is changed.

Figure 8A:
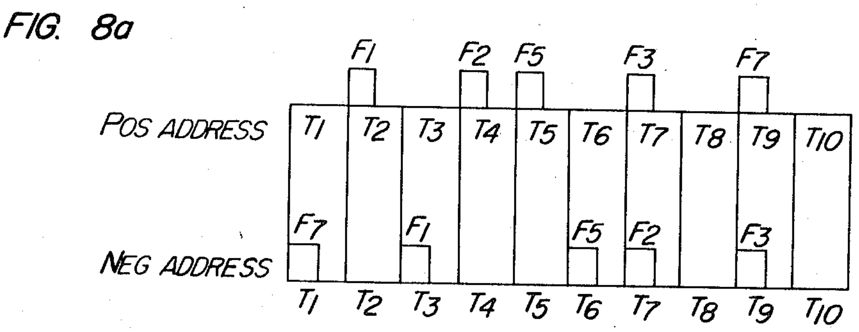
FIGS. 8*a* and *b* are diagrams for explaining the supply of positive and negative addresses.
Figure 8B:
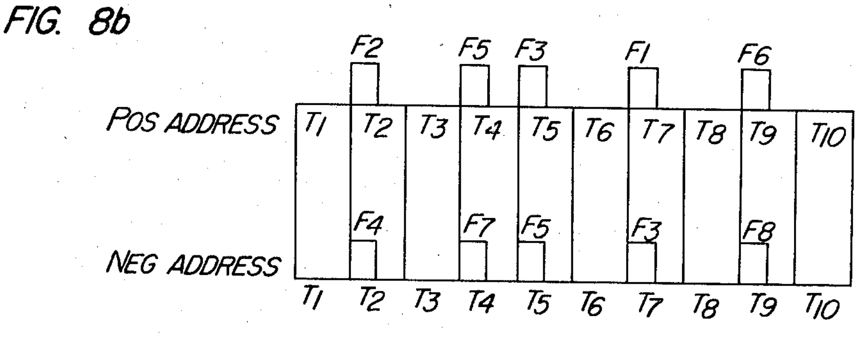

The above rules are shown in FIG. 8. In laying down these rules, consideration is given to the need to simplify the circuit arrangement as far as possible and to minimize the interference between the positive and negative addresses in setting those addresses. Especially it is necessary to put the primary stress on the simplification of the circuit. In the case of the method (1) above, the following conversion rules are laid down:

a. For the frequency slot which appears at the first time slot in the positive address, a corresponding time slot in the negative address is delayed by $n1$.
b. For the frequency slot which appears at the second time slot in the positive address, a corresponding time slot in the negative address is delayed by $n2$.
c. For the frequency slot which appears at the $m$th time slot in the positive address, a corresponding time slot in the negative address is delayed by $nm$.

In line with these rules, the time slot is changed through each of the time slot designator circuits shown in FIG. 6 according to the positive or negative signal information supplied from the terminal 69. By way of explanation, assume that the negative signal information is supplied from the terminal 69. Then, a. Through the time slot designating circuit 60, a parallel binary number equivalent to $n1$ is added in MODULO 2 to the stored parallel binary information for the positive address supplied from the time slot memory 57, to be converted into a negative address time slot memory.
b. In like manner, at the time slot designating circuit 61, $n2$ is added in MODULO 2 to the stored information for the positive address supplied from the time slot memory 58.
c. Generally, at the time slot designating circuit 62, $nm$ is added in MODULO 2 to the stored information for the positive address supplied from the time slot memory 59.

In the way mentioned above, the stored information of a positive address concerning the time slot position is converted into a negative address in the form of a parallel binary code, and time slot pulses corresponding to this binary number are taken out from each of the time slot selector circuits 63, 64 and 65.

In the method (2) above, each time slot position at which the component pulses of an address exist is made the same for positive and negative addresses. Following are the rules for conversion between positive and negative addresses in this case:

a. A frequency which is higher by $l_1$ than the frequency at the first time slot position of the positive address is given to a corresponding time slot of the negative address.
b. A frequency which is higher by $l_2$ than the frequency at the second time slot position of the positive address is given to a corresponding time slot of the negative address.
c. A frequency which is higher by $l_m$ than the frequency at the $m$th time slot position of the positive address is given to a corresponding time slot of the negative address.

Under the above-mentioned rules, the circuit arrangement for the address supply can be simplified by giving to the negative address a frequency which is higher than each frequency of the positive address by the value of $l_1 = l_2 = ....... = l_m = l$. The frequency of the negative address is determined, in this case, by adding in MODULO 2 a parallel binary bit which appears at each time slot of the frequency number set for the positive address, to the binary bit of $l$. When a positive or negative address is given at the variable address supply circuit shown in FIG. 6, the method 2 is employed. It may been seen from the above that a positive or negative address can be determined by any of the methods 1 and 2. Assume that since the pattern of the F–T matrix address is unusual, the time slot position is fixed for all the addresses or the frequency slot to be used is fixed for all the addresses. In the former case, there is no need for the dial numbers 1, 2, 3, ...., $i$ as shown in FIG. 5 and also the time slot memory and the time slot selector circuit for setting the time slot are eliminated from FIG. 6. In the latter case, the dial numbers $i$+1, $i$+2, $i$+3, .... 2$i$ as shown in FIG. 5 are unnecessary and the frequency slot memory can be removed from FIG. 6.

As is understood from the above description, the address supply circuit 12 comprises:

1. A means by which both positive and negative code pulses of the primary modulator are applied to a common delay line shift register, and the time slot pulse obtained from this shift register for each code pulse is switched by a variable address selection command or intrinsic address selection command, mostly depending on which is involved, the calling party or the called party, to be applied to the variable address-setting circuit or intrinsic address-setting circuit respectively.
2. A means by which the time slot number and the frequency slot number of the F–T matrix cell where the component pulse is located are determined as a dial number; the time slot number and the frequency slot number corresponding to each component pulse of an address are positioned in such a manner as to have a certain relationship with each other; a binary dial number is written in and stored in that one of the time slot memories and frequency memories equal in number to the component pulses of the address which corresponds to the dial order, by counting the number of dial pulses generated in one dialling operation, said wiring operation being conducted in accordance with the dial order by the output of the shift register actuated by a single $D_s$ contact pulse generated at each dialling operation; a predetermined time slot pulse is selected by reading the time slot memory among a plurality of the output pulses of the delay line shift register corresponding to the input code pulses; and corresponding binary numbers of the frequency slot memory are read by the above-mentioned pulses and combined, thereby to determine the path to the frequency to be switched to.
3. A means by which the information as to whether the input code pulse is positive or negative is stored for each code pulse; in a positive and negative address system in which the time slot position is changed without changing the frequency slot used, a negative address is given by adding in a binary way the stored time slot information to the binary information derived from the negative information under a certain rule; and in a positive and negative address system in which the frequency slot position is changed without changing the time slot used, a negative address is given by adding in a binary way the stored frequency information read out by the time slot pulse to the binary information derived from the negative information under a certain rule.

Provided with these means, the address supply circuit accomplishes a logic operation in a digital manner, contributing to the reduction of the size and the improved reliability of the apparatus according to the present invention.

Figure 9:
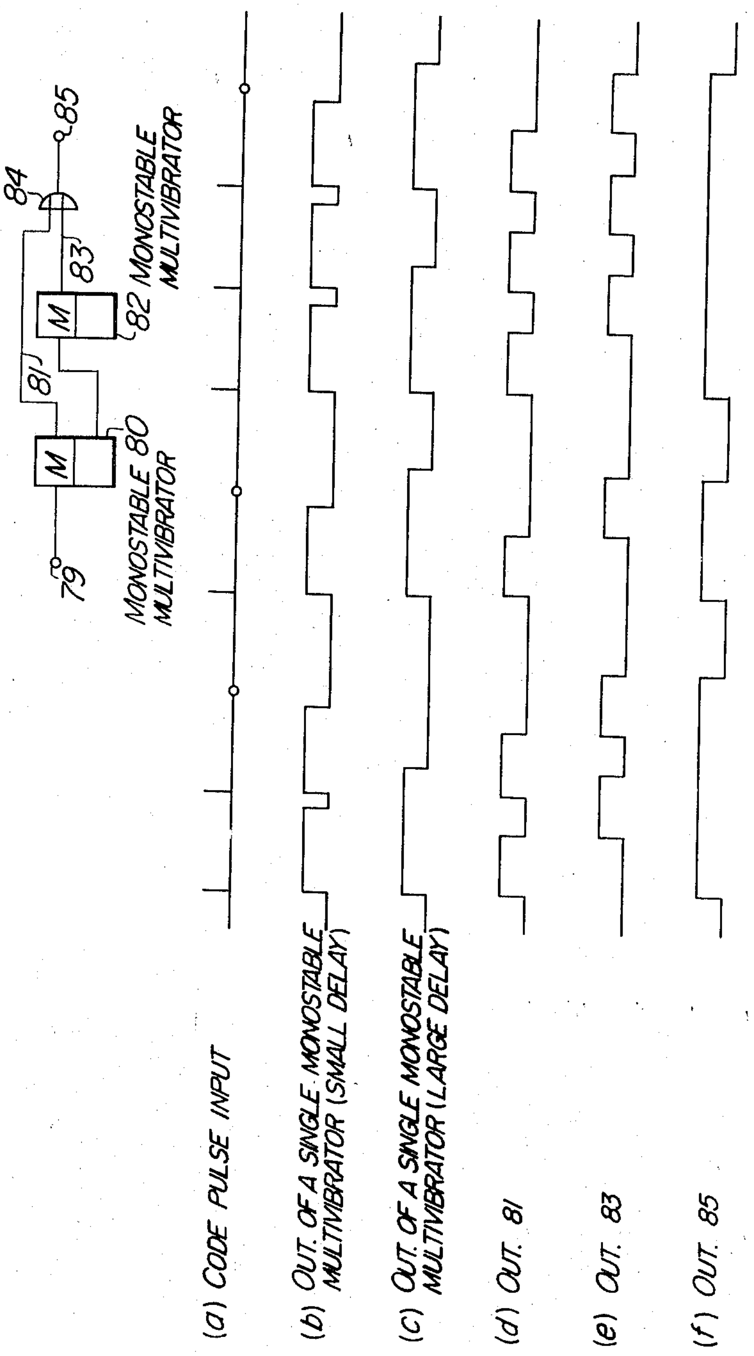
FIG. 9 illustrates a diagram of a circuit for generating a transmission-reception switching pulse and also a diagram for explaining the operation thereof.

A block diagram of the transmission-reception switching pulse generator circuit 20 and a diagram for illustrating the waveform of such a pulse are shown in FIG. 9. It means little if the receiving RF input is cut off by each component pulse of the address during the existence of a transmitting pulse. This is because, even if a time interval without any component pulses is left uncut over a sample interval following the appearance of a code pulse, the decoding of the address by the pulses received during such an interval cannot be ascertained as far as the communication between the two stations is an asynchronous one. Therefore, let us consider a hypothetical case in which the receiving RF input is cut off completely over a sample interval and the RF pulses can be received only during the break of a communication as far as the code pulses exist, rather than intercepting the receiving RF input by the component pulses of the address.

In such a case, as shown in FIG. 9, a code pulse series is applied to the input terminal 79 of the transmission-reception switching pulse generator circuit. If there is only one monostable multivibrator 80, the transmission-reception switching pulses appearing at the terminal 81 take the form as shown in (b) or (c) of FIG. 9. If an attempt is made to generate a transmission-reception switching pulse through a single monostable multivibrator for each code pulse, there inconveniently develops a portion at the end of a sample interval which is left without being intercepted. If the width of the output pulse from the monostable multivibrator is extended beyond the sampling interval to eliminate such a free interval, the monostable multivibrator is not actuated for the adjacent second code pulse, causing a free time interval which cannot be intercepted as shown in (c). A means for eliminating such a free time interval is explained with reference to (d), (e) and (f) of FIG. 9. As shown in the block diagram in FIG. 9, two successive monostable multivibrators are triggered, the output pulse of the first monostable multivibrator being made narrower than the sampling interval. And the second monostable multivibrator is triggered at the fall position of the output pulse of the first monostable multivibrator, generating a pulse wide enough to cover the second code pulse of the adjacent two code pulses. Then the outputs of the first and second monostable multivibrators are combined at the OR gate to generate a transmission-reception switching pulse. In this way, the sampling interval where code pulses exist is completely covered, and by intercepting the receiving RF circuit by this transmission-reception switching pulse, the leakage to the receiving RF of a radio pulse due to any time slot position within a sample interval can be attenuated to such a level as can be permitted by the performance of the intercepting switch for a receiving RF input.

Figure 10:
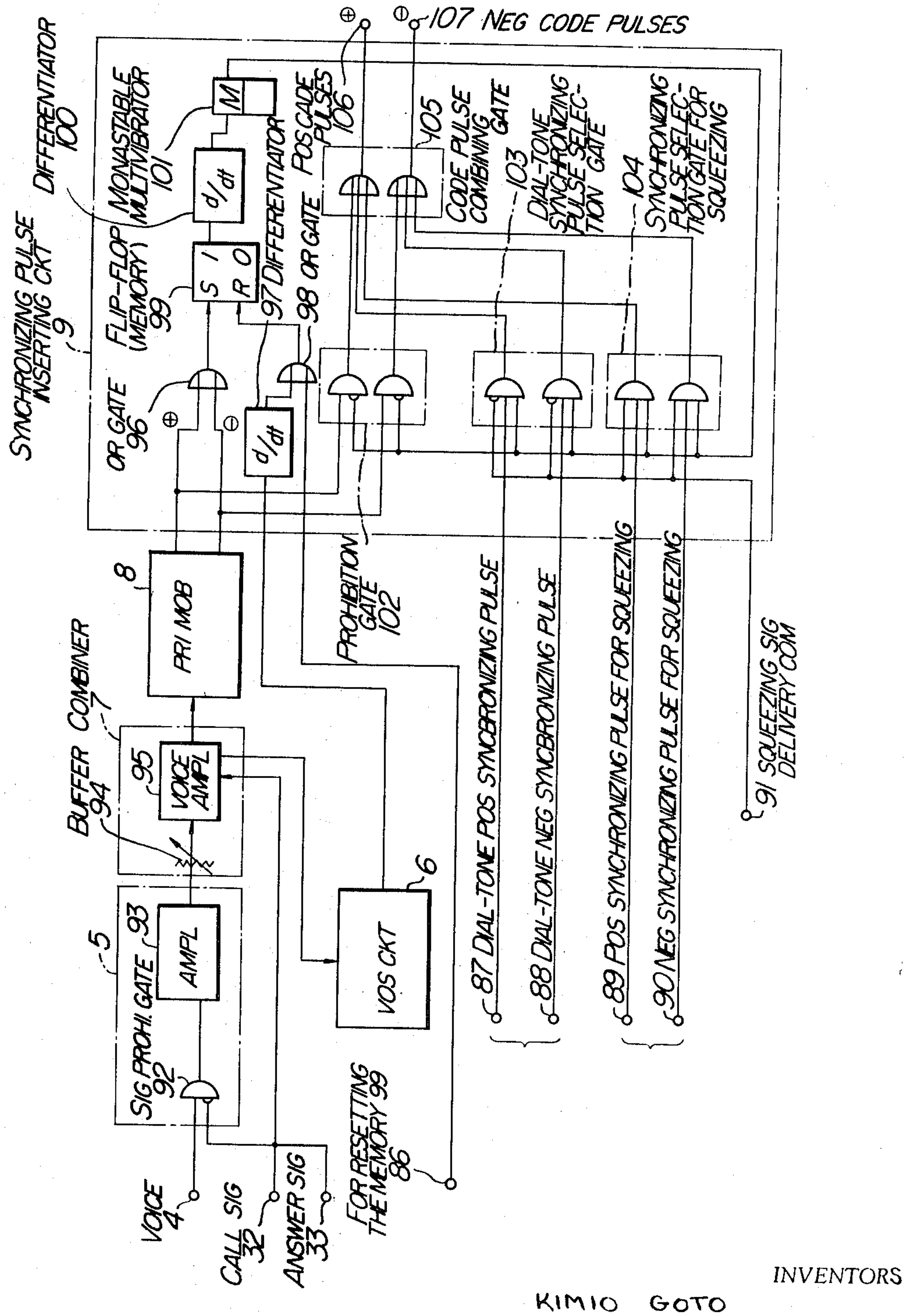
FIG. 10 is a detailed block diagram showing each circuit of an embodiment in connection with the insertion of a synchronizing pulse.

A detailed block diagram illustrating each part of an embodiment concerning the insertion of a synchronizing pulse is shown in FIG. 10. The numeral 4 shows an input terminal for a voice, and 32 and 33 input terminals for a call signal and an answer signal respectively. The voice amplifier circuit consists of a signal prohibition gate 92 and an amplifier 93. The combining circuit 7 consists of a buffer 94 and a voice amplifier 95. As mentioned earlier, the numeral 6 is the VOS (Voice Operated Switch) circuit, 8 the primary modulator and 9 the synchronizing pulse inserting circuit. The synchronizing pulse inserting circuit 9 consists of the OR gates 96 and 98, differentiators 97 and 100, memory (flip-flop) 99, monostable multivibrator 101, primary modulator output code pulse prohibition gate 102, dial-tone synchronizing pulse selection gate 103, offering synchronizing pulse selection gate 104 and code pulse combining gate 105. The numeral 86 shows an input terminal for resetting the memory 99, the numerals 87 and 88 input terminals for positive and negative synchronizing pulses for dial-tone respectively, the numerals 89 and 90 input terminals for the positive and negative synchronizing pulses respectively for squeezing, the numeral 91 an input terminal for a squeezing signal delivery command, and the numerals 106 and 107 output terminals for positive and negative code pulse trains respectively.

It will been seen from FIG. 10 that when a signal is applied to the combining circuit 7, a voice is intercepted by the prohibition gate 592. A voice or signal is not only applied through the combining circuit 7 to the primary modulator 8, but also taken out from the amplifier 95 by the VOS circuit 6.

Figure 11:
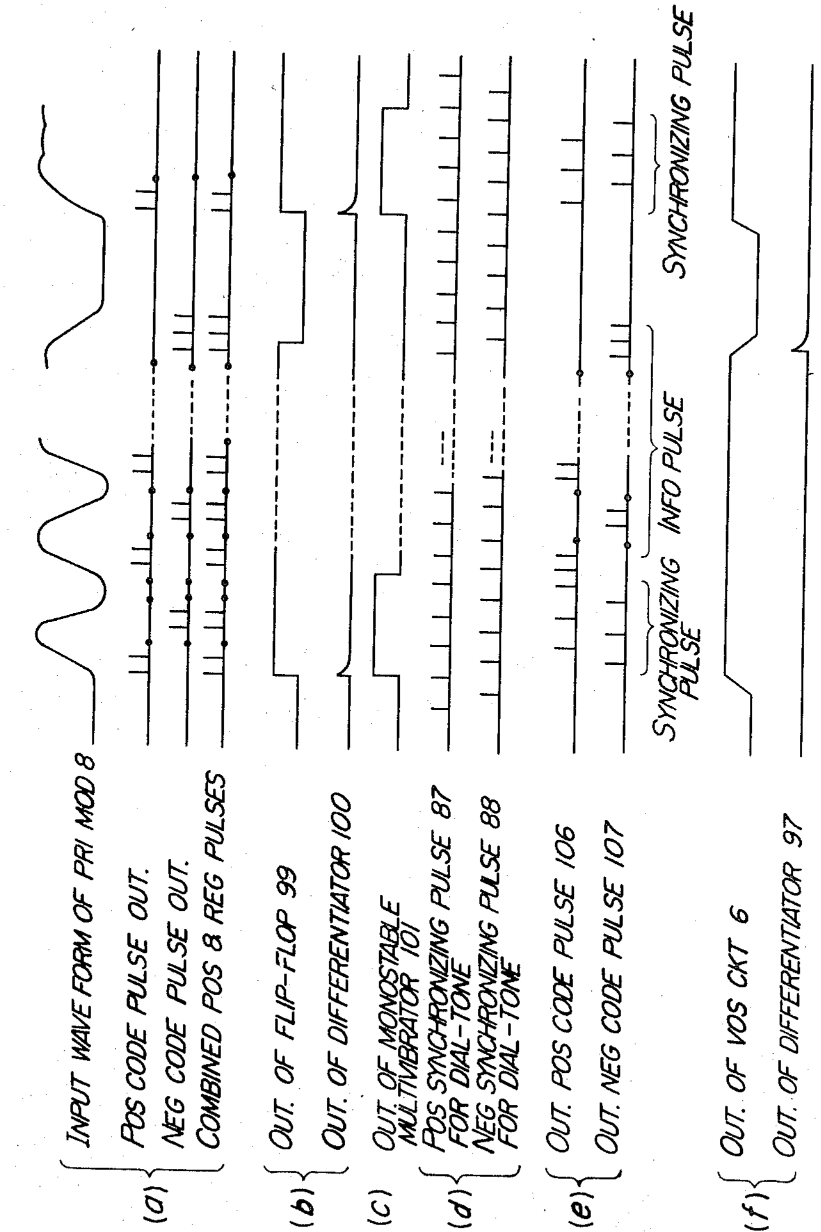
FIG. 11 is a diagram for explaining the operation of the circuit shown in FIG. 10.

As is clear from FIG. 11(a), positive and negative code pulse trains appearing as an output of the primary modulator are combined at the OR-gate 96 and then immediately stored by the flip-flop 99. The differentiator circuit 100 differentiates the starting point of the storing by the flip-flop (see FIG. 11(c)), the resulting differentiated pulse generating a pulse with a certain width at the output of the monostable multivibrator 101 as shown in FIG. 11(c). Over said pulse width, the code pulse train of the primary modulator output is prohibited by the prohibition gate 102. On the other hand, during this pulse width, the synchronizing pulse for dial-tone from the terminals 87 and 88 or the synchronizing pulse for squeezing from the terminals 89 and 90 is taken out by the selection gate 103 or 104 as shown in FIG. 11(d) and 11(e), and further by the terminals 106 and 107 through the combining gate 105. At this time, the flip-flop 99, unless reset, remains in the state as originally held by the code pulse which appeared in the output of the primary modulator, and there is no guarantee that a synchronizing pulse is delivered when resuming talking after a break. Once a voice or signal is terminated, therefore, it is necessary to erase the stored information of the flip-flop 99 immediately and to see, when resuming a voice or a signal, that the flip-flop 99 stores the information again through the output code pulse of the primary modulator which first appears. For this purpose, the voice breaking information is taken out by the output of the VOS circuit 6 and differentiated by the differentiating circuit 97 so that the information stored in the flip-flop 99 is cleared (see FIG. 11(f)). The maximum voice-broken period which allows a synchronizing pulse to be delivered at the time of resuming a voice depends on the speed at which the VOS circuit 6 detects the voice breaking point.

In short, the start of a voice or signal transmission is immediately detected and stored as the output pulse of the primary modulator is generated, and a synchronizing pulse can be inserted and delivered over a certain period from the start of storage during which the voice and signal are cut off. Moreover, in resuming a voice or signal, a synchronizing pulse can be delivered by detecting the stoppage of the voice through the VOS circuit 6 as soon as such stoppage occurs and by releasing said stored information. In this way, the synchronizing pullin by the receiver of the called party is facilitated at the starting point of a voice or signal, increasing the effect the effect of the present invention.

Figure 12:
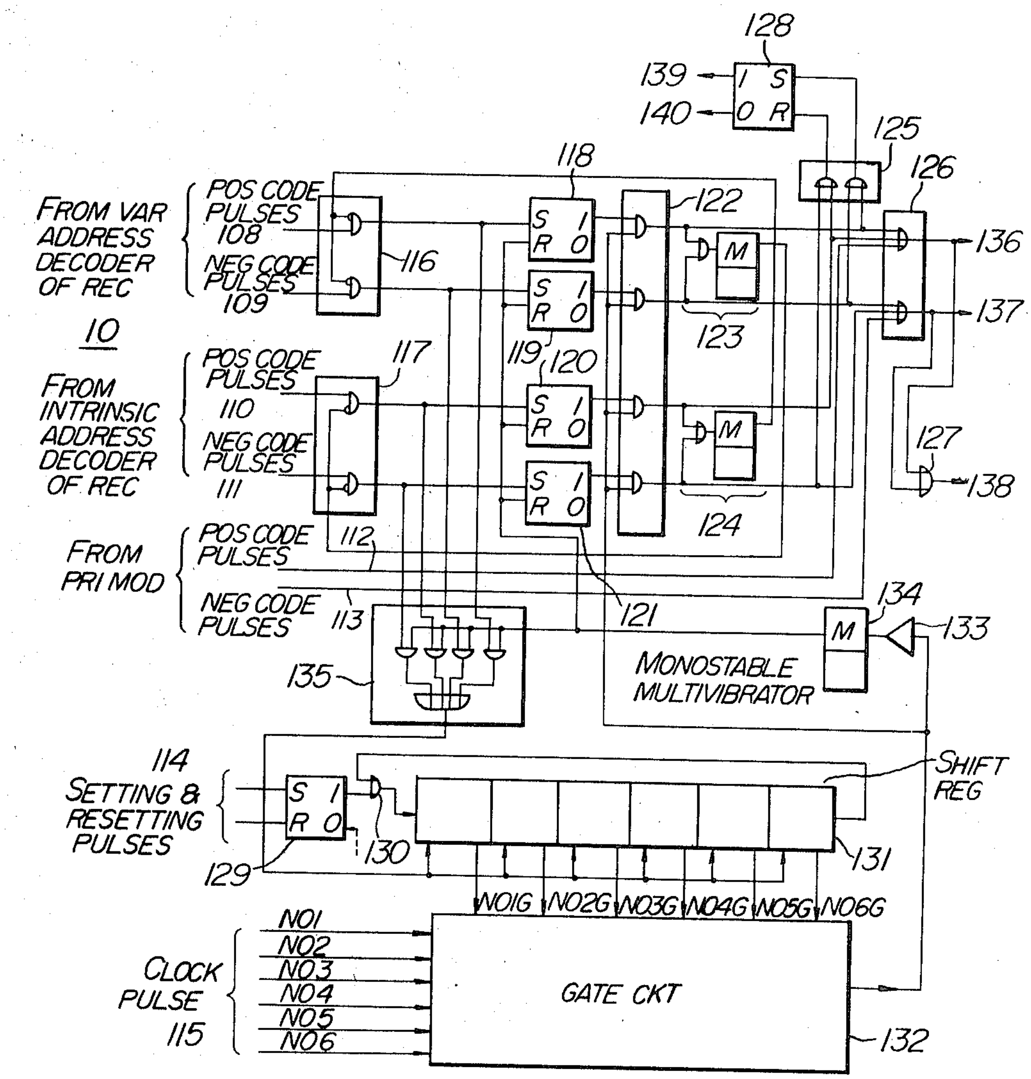
FIG. 12 is detailed bock diagram showing an embodiment of the synchronizing circuit for relay.

A detailed block diagram of an embodiment of the relay synchronizing circuit 12 is shown in FIG. 12. The numerals 108 and 109 show input terminals for positive and negative code pulse trains respectively from the variable address decoder of the receiver, 110 and 111 input terminals for positive and negative code pulse trains respectively from the intrinsic address decoder of the receiver, 112 and 113 input terminals for positive and negative code pulse trains respectively supplied from the primary modulator, 114 shows an input terminal for setting and resetting pulses of the flip-flop 129, 115 an input terminal for clock pulses supplied from the clock pulse generator circuit 16, 116 and 117 show input terminals for a relay input code pulse, 118 and 119 flip-flops for storing positive and negative code pulse trains respectively of the output of the variable address decoder of the receiver, 120 and 121 flip-flops for storing positive and negative code pulse trains respectively of the intrinsic address decoder output of the receiver, 122 shows a gate circuit for reading a code pulse, 123 and 124 show sampled interval holding circuits, 125 shows an OR gate circuit for combining an output code pulse of the variable or intrinsic address decoder of the receiver, 126 and OR gate circuit for combining a positive or negative code pulse, 127 or OR gate circuit for combining positive and negative code pulses. 128 a flip-flop memory for selecting a transmitting address, 129 a flip-flop for triggering a shift register, 130 an OR gate circuit for the shift register circulation, 131 a shift register, 132 a gate circuit for reading a synchronizing pulse, 133 an inverter, 134 a monostable multivibrator, 135 a gate circuit for detecting a stepout, 136 an output terminal for a positive code pulse train after transmission synchronization, 137 an output terminal for a negative code pulse train after transmission synchronization, 138 an output terminal for positive and negative code pulse trains after transmission synchronization, 139 an output terminal for a transmitting intrinsic address selection command, and 140 an output terminal for a transmitting variable address selection command.

The relay input code pulses or the positive and negative pulses of the output code pulse trains of the variable address decoder for the receiver are applied from the terminals 108 and 109 respectively through the prohibition gate 116 to the flip-flops 118 and 119 respectively to be stored there. Similarly, the positive and negative pulses of the output code pulse trains of the intrinsic address decoder for the receiver are applied from the terminals 110 and 111 to the flip-flops 120 and 121 respectively through the prohibition gate 117.

In this case, the random synchronizing pulse train No. 1, No. 2, ...., or No. 6 which is read from the synchronous reading gate 132 in accordance with the holding position of the shift register reads the information stored at the terminals 110 and 111 and the flip-flops 120 and 121 from the code pulse reading gate 122. The information stored in the flip-flops 118, 119, 120 and 121 is so arranged as to be cleared at the fall position of the synchronizing pulse used at the code pulse reading gate 122, said clearing operation being actually carried out through the monostable multivibrator 134. It follows therefore that the information stored in these flip-flops is updated for each code pulse. The waveforms of the above operations are illustrated in FIG. 13.

The code pulses which have come to agree with the transmission synchronization are taken out from the terminals 136 and 137 through the OR-gate 126. They also appear at the terminal 138 as a combined pulse of positive and negative pulses through the OR gate 127. The OR-gate 126 picks up either positive or negative pulses only among the code pulses which are taken out from the synchronizing pulse inserting circuit 9 through the primary modulator 8 and the terminals 106 and 107, and also among the transmission-synchronized code pulses corresponding to the output of the variable and intrinsic address decoder of the receiver. The OR-gate 125 applies in a batch the transmission-synchronized positive and negative code pulses corresponding to the output of the variable address decoder of the receiver, to the setting side of the flip-flop 128, and also those corresponding to the output of the intrinsic address decoder of the receiver, to the resetting side thereof. The flip-flop 128 produces at the terminals 139 and 140 the commands to select intrinsic and variable addresses respectively for transmission in accordance with the variable and intrinsic address outputs of the receiver, and applies them to the signal generator and address selector circuit 3. The numeral 123 and 124 show circuits which produce a pulse with the width of one sample interval each time a relay code pulse appears. When a code pulse is produced at the output of the variable address decoder of the receiver, a pulse generated by the circuit 123 prohibits by means of the prohibition gate 117 the passage of the output code pulse of the intrinsic address decoder for the receiver. This also holds true when there is a code pulse in the output of the intrinsic address decoder of the receiver. In this way, it is possible to prevent code pulses of two addresses from being applied at the same time to the address supply circuit 12 at the time of relaying.

Figure 13:
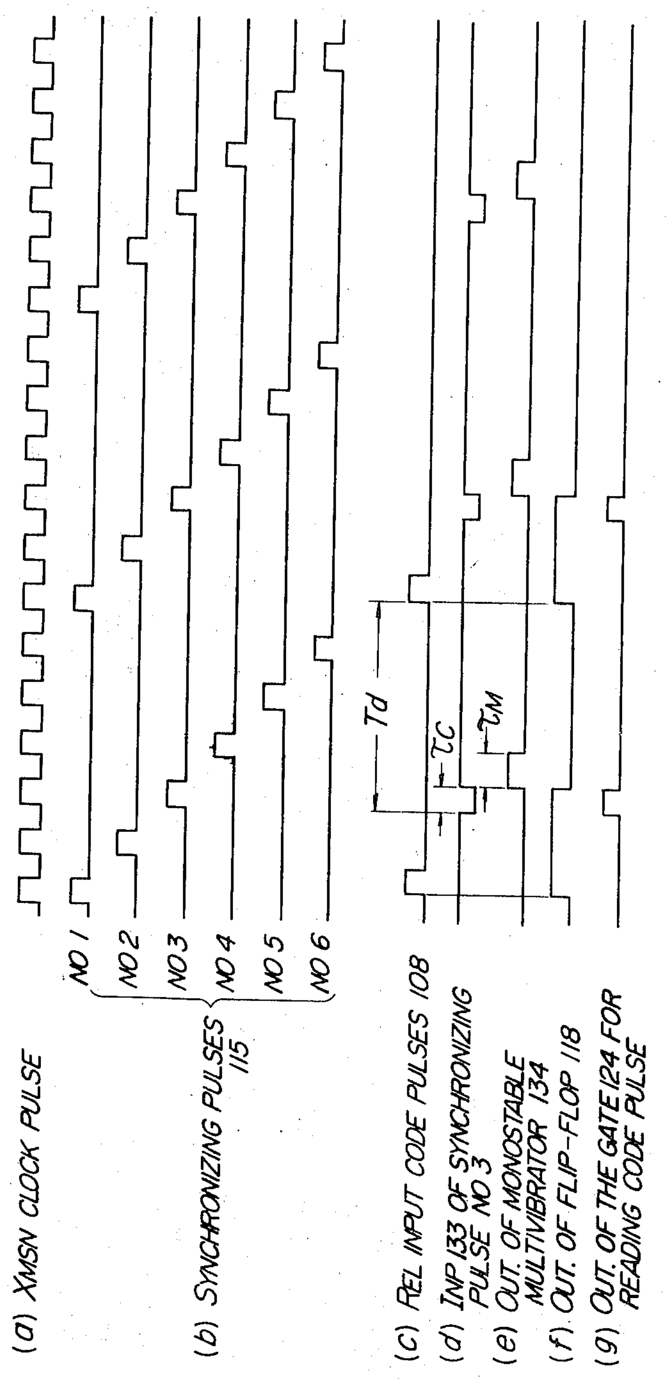
FIG. 13 is a diagram for explaining the operation of the synchronizing circuit for relay under the normal condition.

As illustrated in FIG. 13, the synchronizing pulses No. 1, No. 2, ... No. 6 are all in synchronism with the transmitting clock pulses, and the pulse interval of the synchronizing pulse is equal to that of one sample interval. The pulse locations of two adjacent synchronizing pulses are an accumulation of two clock pulse intervals. Accordingly, the use of any synchronizing pulse enables the time relationship between the operation of the address supply circuit 12 and that of the RF modulation to be maintained normal.

Assume that, as shown in FIG. 13, the variable or intrinsic address output code pulse of the receiver, namely, the relay input code pulse appears later than the synchronizing pulse by *Td*. Then, the above-mentioned relationship of the operations is normal if the following inequality is satisfied:

$$Td > \tau_c + \tau_M \quad (1)$$

where $\tau_c$ is the width of the synchronizing pulse and $\tau_M$ the width of the output pulse of the monostable multivibrator which starts to be generated at the fall position of the synchronizing pulse.

Figure 14:
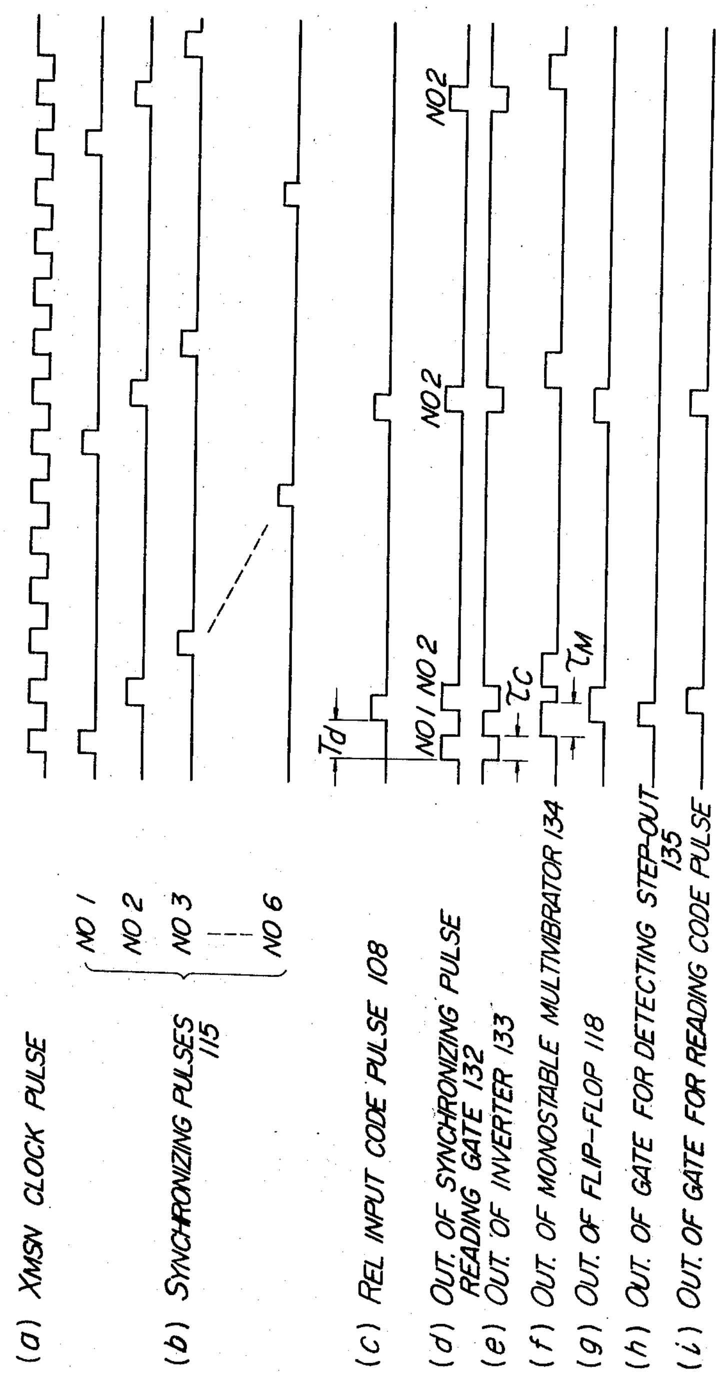
FIG. 14 is a diagram for explaining the operation of the synchronizing circuit for relay under an abnormal condition.

If a relay input code pulse appears with the relationship $$Td < \tau_c + \tau_M \quad (2)$$

the transmission-synchronized code pulse either disappears or its width becomes narrower. FIG. 14 is a diagram for explaining the operation to remove such an abnormality. In the example shown in FIG. 14, an existing synchronizing pulse, say, the pulse train No. 1, unlike in the case of FIG. 13, is positioned in advance of the relay input code pulse, say, the input of the terminal 108, which appears first following the stoppage of a voice. It is therefore evident that the information which is stored in the flip-flop 118 by the fall of the relay code pulse cannot be read by the synchronizing pulse train No. 1. However, the timing of the output pulse from the monostable multivibrator 134 which is generated at the fall point of the synchronizing pulse train No. 1 fortunately agrees with that of the relay input code pulse. This is due to the fact that the inequality $Td < \tau_c + \tau_M$ is satisfied. This agreed portion is taken out by the stepout detection gate 135 and applied to the shift register 131, which is thereby shifted. The outputs No. 1G, No. 2G, ....., No. 6G of the shift register correspond to the synchronizing pulse trains No. 1, No. 2, No. 3, ...., No. 6 respectively supplied from the clock pulse generator circuit 16 to the terminal 115. These synchronizing pulses are sequentially scanned by the stepout information. After the scanning is completed up to the train No. 6, it is started again from the train No. 1. As a result, the synchronizing pulse train No. 1 transfers to the train No. 2, which reads the information out of the flip-flop 118. The setting input to the flip-flop 129 which triggers the shift register 131 is automatically supplied by the closing of the power switch of the receiver.

Figure 15:
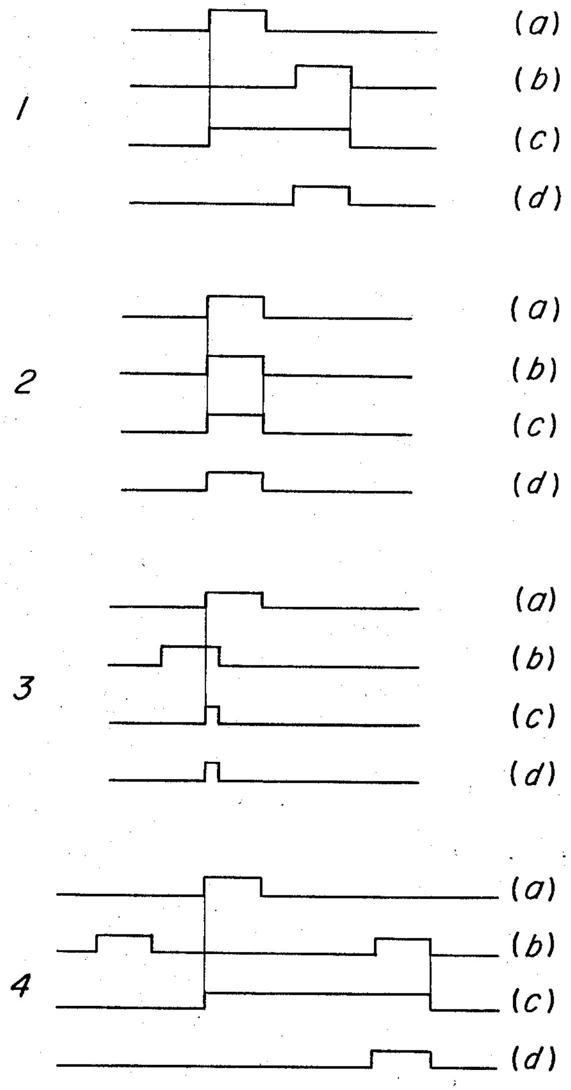
FIG. 15 is a diagram for explaining the waveform of a single synchronizing pulse for relay.

Assume that, instead of employing the above-mentioned circular scanning system, only one synchronizing pulse is used to achieve a transmission-synchronization. FIG. 15 shows a diagram for explaining the operation of such a system. The letter *a* shows a relay input code pulse, *b* a synchronizing pulse, *c* the waveform of the flip-flop for storing the relay input code pulse and *d* the output waveform which is "gated" by the synchronizing pulse from the waveform b. FIGS. 15–1, 15–2, 15–3 and 15–4 show the advancement, agreement, partly falling behind, and completely falling behind in timing respectively, of the relay input code pulse with respect to the synchronizing pulse, FIG. 15–4 showing the case of the falling behind thereof, but the forward end of the relay input code pulse being superposed on the rear end of the synchronizing pulse. It is also assumed that the setting is effected at the rise portion of the relay input code pulse of the flip-flop and the resetting at the fall portion of the synchronizing pulse.

In FIG. 15, especially in the case of FIG. 15–3, the width of the output pulse obtained is smaller than the predetermined width, and in the worst case no such output appears. If this condition persists, the information pulse to be relayed completely disappears. The nearer the original synchronizing frequency of the pulse sent out from the end office is to the synchronizing frequency of a relay station, the above-mentioned condition is more liable to persistently occur. The circular scanning system of a synchronizing pulse is aimed at regaining the condition of a synchronized transmission by transferring to another synchronizing pulse train with an adjacent pulse position as soon as such an undesirable condition develops. Under this system, a considerable number of synchronizing pulse trains which are almost equal in number to the time slots are scanned within one sample interval, because when an abnormal condition to satisfy the inequality $Td < \tau_c + \tau_M$ develops between the relay input code pulse and the synchronizing pulse the transfer is made from a selected synchronizing pulse train, if any, to an adjacent synchronizing pulse delayed in time phase, thereby to achieve a synchronization. The synchronizing pulse train to which the transfer is made is not necessarily the adjacent one if it exists within the one sample interval of the relay input code pulse and also if such a synchronizing pulse train falls within the normal period of time which satisfies the inequality $Td>\tau_c+\tau_M$ with respect to the relay input code pulse that developed the abnormal condition. Considering this, a combination of a minimum of two synchronizing pulse trains out of the above-mentioned synchronizing pulses No. 1, No. 2, .... No. 6 is alternately selected each time an abnormal condition develops.

Further, if the receiver of the called end office is in a state of synchronizing cutoff, said receiver may develop a stepout depending on the speed at which the above-mentioned transfer is made due to an abnormal condition caused at the relay station. To prevent this, it is necessary for the end office receiver to maintain the same synchronizing position as far as possible. For this purpose, the code pulses after transmission synchronization may be held within a sample interval, which code pulse is "gated" by a third synchronizing pulse among the pulses No. 1, No. 2, ... No. 6, thereby to take out a final transmission code pulse.

From the above description, the relay synchronizing circuit according to this invention is seen to have the following advantages:

1. The two code pulse trains obtained from the receiver by means of its variable and intrinsic address decoder are divided into positive and negative pulses and stored in four flip-flop circuits, at which time a synchronizing pulse train is selected. By this synchronizing pulse train the reading is effected to achieve a relay synchronization.
2. When a code pulse from the variable address decoder or the intrinsic address decoder of the receiver is stored in the above-mentioned flip-flops, the code pulse input of the intrinsic address decoder or the variable address decoder respectively of the relay synchronizing circuit is intercepted over a sampling interval in order to prevent the code pulses due to two addresses from being simultaneously applied to the input of the delay line shift register of the address supply circuit 12.
3. The polarity of the stored information is switched depending on which pulse appears at the relay input terminal, the code pulse of the intrinsic address decorder or that of the variable address decoder. In accordance with such a polarity, a relay address selection command can be delivered.
4. A plurality of synchronizing pulse trains have the same interval between pulses as the sampling interval of the primary modulator, the adjacent two pulse trains having pulses which are staggered by the distance equal to the time slot interval. This staggered pulse train, therefore, may be used for relay synchronization without affecting the subsequent digital process and wireless switching operations at the time of address supply.
5. An abnormal condition in which a code pulse disappears or becomes narrower after relay synchronization is detected by detecting the portion at which the relay input pulse is superposed on a third pulse whose width is equal to or larger than that of a synchronizing pulse employed and which is synchronizing with the synchronizing pulse. The pulse thus detected triggers the shift register and transfers it to another synchronizing pulse, thereby making it possible to always prevent the occurrence of the aforementioned abnormal condition.
6. There are a plurality of synchronizing pulse trains and at the time of the occurrence of an abnormal condition the transfer is made from one pulse train to another, thereby preventing the continuation of such an abnormal condition.
7. The code pulse after synchronization is widened over a sampling interval and gated again by a third fixed synchronizing pulse, thereby preventing a rapid synchronous transfer. As a result, the stepout of synchronized interception in the receiver of the called party can be avoided.

In addition, this relay synchronizing circuit can be completely converted into a digital operation, reducing the size and improving the reliability of the apparatus, which greatly enhances the effect of the present invention.

As described in detail above, the present invention satisfies all the nine requisites mentioned earlier and a digital circuit can be employed at almost any point, contributing to the reduction of size as well as to the improved reliability of the apparatus.

Each component explained in detail above contains a novel and unique invention for accomplishing a required operation of such a component to its full ability, further adding to the effect of the invention.

What is claimed is:

1. A random access discrete address system comprising all or a part of: a means for generating, through call information, a call signal which connects the line for a certain period of time and also a variable address selection command which connects the line until the completion of a conversation and for generating, through call signal receipt information, a ring-back signal and an intrinsic address selection command which connects the line until the completion of a conversation, and further for generating in some cases a busy signal and an intrinsic address selection command and a variable address prohibition command which connect the line for a certain period of time; a means for switching each time slot of an F–T matrix address and reading out for each time slot an address memory provided by a subscriber's number-setting method including a dial or touch tone, thereby to determine the path to the frequency slot of said F–T matrix address to be switched to; a means for intercepting an RF input of receiver by means of a pulse which is continued for a period longer than one sampling interval each time a code pulse is generated; a means for detecting an output code pulse of a primary modulator each time a voice or signal starts and for sending out a synchronizing code pulse for a receiver of a called party; and a means for temporarily storing output code pulses of said receiver, reading said code pulses through a synchronizing pulse for a transmitter at the same station as one comprising said receiver, and transferring to another synchronizing pulse train by detecting a stepout each time said stepout occurs, thereby to accomplish a synchronized relay.

2. A random access discrete address system comprising at least a part of: a means for generating a single pulse, which connects the line for a certain period of time, through a calling information delivery command generated by a hookoff or address-setting operation or through a ring-back and a busy information delivery command generated by the reception of a call signal by a called party, said means selecting a combination of gate circuits assigned for each said information delivery command and switching, by means of said single pulse, to a multifrequency signal or digital signal corresponding to said information, thereby to produce said signal for a certain period of time; a means for holding a calling information delivery command and a ring-back information delivery command until a conversation is finished, a variable address and an intrinsic address being selected respectively by said commands; and a means for selecting an intrinsic address and prohibiting the selection of a variable address for the duration of said single pulse used for delivering a busy signal in connection with a busy information delivery command.

3. A random access discrete address system comprising at least a part of: a means for applying both positive and negative output code pulses of a primary modulator to a common delay line shift register, a part or the whole of F–T matrix time slot pulses obtained for each input code pulse being switched depending on which is involved, a calling party or a called party, thereby to supply a variable address or an intrinsic address; a means for determining as a subscriber's number a time slot number and a frequency slot number themselves in an F–T matrix cell where component pulses of an address are located, said subscriber's number being arranged in such a manner that a time slot number and a frequency slot number corresponding to each component pulse of said address maintains a certain local relationship with each other, the numerical information generated by setting each digit of said subscriber's number being written or stored into a time slot memory or a frequency slot memory as a parallel binary number through measurement or by direct storage, the time slot memory or frequency slot memory to be written being selected in such a manner as to correspond to each digit of the subscriber's number and according to the order of selection determined by the shift register which is actuated by each single pulse generated at the time of setting each digit of the subscriber's number, a time slot pulse corresponding to a predetermined address being selected from among the output time slot pulses of the delay line shift register by reading said time slot memory, the frequency slot memory corresponding to said address being read by said time slot pulse as a parallel binary pulse, said time slot pulse and parallel binary pulse being combined, thereby to determine the path to a frequency to be switched to; and a means for storing positive and negative information for each input code pulse, the binary information provided under a certain rule for the polarity of a code pulse which is different from the polarity of a predetermined positive or negative address being added to the time slot memory and/or the frequency slot memory in a binary notation, thereby to supply an address different from the predetermined address.

4. A random access discrete address system in which a first single pulse narrower than a sampling interval is generated at a rise point of an output code pulse of a primary modulator each time of generation of said output code pulse, second single pulse being generated at a fall point of said output code pulse, the widths of said first and second pulses being determined in such a manner that the sum of said widths is slightly greater than the length of a sample interval, said first and second pulses being combined, thereby to intercept an RF input circuit of receiver.

5. A random access discrete address system including a synchronizing pulse inserting means comprising at least a part of: a means for immediately detecting the start of a voice or signal through the generation of an output code pulse of a primary modulator and also storing said start, said voice or signal being cut off for a certain period of time from the start of said storage, a synchronizing pulse for the receiver of a called party being delivered during said period of time; and a means for detecting the stoppage of a voice or a signal by means of a voice-operated switch circuit on completion of said stoppage, thereby to clear said storage.

6. A random access discrete address system including a relay synchronizing system comprising at least one of: a means for storing in different memories a plurality of positive and negative code pulse trains respectively obtained from a plurality of address decoders of a receiver, the information stored in said memories being read by a synchronizing pulse train selected out of a plurality of synchronizing pulse trains whose pulse interval is equal to a sampling interval of a primary modulator and whose interval between adjacent two pulse trains is equal to integral multiples of the time slot width of an F–T matrix address, thereby to achieve a synchronized transmission; a means for detecting in which of said memories the storage is made, and for intercepting the input to that memory in which no storage is made, over a sampling interval after said detection; a means for selecting and holding over a sample interval an address to be supplied in transmission, through said detection of the storage; a means for detecting each time of a stepout a portion where a relay input code pulse is superposed on a third pulse whose width is equal to or larger than that of a synchronizing pulse being employed and which is in synchronism with said synchronizing pulse, a pulse obtained by said superposition causing a circular-type shift register to be shifted, thereby to transfer to another synchronizing pulse train until there is no more of such shift pulses; and a means for widening said code pulse to the width slightly smaller than the sample interval after the completion of synchronized transmission, said code pulse being sampled by the third synchronizing pulse train which is always fixed.

* * * * *